United States Patent [19]
Lebby

[11] Patent Number: 5,337,391
[45] Date of Patent: Aug. 9, 1994

[54] OPTOELECTRONIC SUB-MODULE AND METHOD OF MAKING SAME

[75] Inventor: Michael S. Lebby, Apache Junction, Ariz.

[73] Assignee: Motorola, Inc., Schaumburg, Ill.

[21] Appl. No.: 56,276

[22] Filed: May 3, 1993

[51] Int. Cl.⁵ .......................... G02B 6/00; G02B 6/36
[52] U.S. Cl. ............................................. 385/88
[58] Field of Search ...................... 385/88, 89, 90, 92

[56] References Cited

U.S. PATENT DOCUMENTS

| | | | |
|---|---|---|---|
| 4,727,248 | 2/1988 | Meur et al. | 385/89 X |
| 4,826,272 | 5/1989 | Pimpinella et al. | 385/92 |
| 4,943,136 | 7/1990 | Popoff | 385/46 |
| 5,202,943 | 4/1993 | Carden et al. | 385/92 |

*Primary Examiner*—Akm E. Ullah
*Attorney, Agent, or Firm*—Gary F. Witting; Eugene A. Parsons

[57] ABSTRACT

An optoelectronic sub-module (100,200) having a major surface (103,203) and an edge surface (104) with electrical tracings (116) disposed on the major surface (103,203). A light transmitting device (114) having a working portion is mounted on the major surface (103,203) with the working portion of the light transmitting device (114) directed perpendicularly to the edge surface (104) of the sub-module (100,200), and wherein the light transmitting device (114) is connected to at least one of the electrical tracings (116). An angled reflective surface (109) is formed between the major and edge surfaces. A photodetector (118) having a working portion is positioned on the major surface (103,203) with the working portion of the photodetector (118) positioned over the angled surface (109).

20 Claims, 3 Drawing Sheets

OPTOELECTRONIC SUB-MODULE AND METHOD OF MAKING SAME

BACKGROUND OF THE INVENTION

This invention relates, in general, to optoelectronic devices and, more particularly, to fabrication and interconnection of the optoelectronic sub-modules to optical cables.

This application is related to copending applications that bear serial numbers 07/889,335 U.S. Pat. No. 5,265,184 and 08/019,731 now allowed, titled MOLDED WAVEGUIDE AND METHOD OF MAKING SAME and MOLDED WAVEGUIDE WITH A UNITARY CLADDING REGION AND METHOD OF MAKING, filed May 28, 1992 and Feb. 19, 1993.

In the past, several methods have been used to couple or interconnect an optical cable having a plurality of optical fibers to an optical interface device. These previous methods typically utilize a precision connector that retains the optical cable firmly in place. The plurality of optical fibers is allowed to extend out from the connector, thus exposing a cross-section of the optical fibers. The optical interface device generally is made with V-grooves that are chemically etched into the optical interface device, thereby allowing the plurality of optical fibers in the optical cable to be aligned, i.e., placed and joined with the grooves of the optical interface device. However, since the V-grooves need to be precisely placed, as well as precisely etched to a correct depth to enable adequate alignment, the V-grooves are extremely difficult to manufacture, thereby having a high cost of manufacture.

Since it is important to have the plurality of optical fibers precisely aligned to a working portion of the optical interface device, the fabrication of the V-grooves or channels must be formed with precise tolerances, thereby making the optical interface device and connector very expensive to manufacture. Additionally, since precision placement of the optical fiber is achieved one fiber at a time, mass production of both the optical interface device and the connector is not possible with this method of manufacture, thus increasing the expense of manufacturing. Further, use of V-grooves severely limits design of optical connectors, thus limiting flexibility as a whole.

It can be readily seen that past methods for coupling or interconnecting an optical interface device and an optical cable have severe limitations. Also it is evident that past methods used to fabricate or manufacture the optical interface device and the connector are not only complex requiring high precision and expensive, but also not an effective manufacturing process. Accordingly, it is desirable to have a method and article for coupling or interconnecting an optical cable to an optical interface device, that has a low cost, and is easily manufactured.

SUMMARY OF THE INVENTION

Briefly stated, an article and a method for coupling or interconnecting an optical cable and an optoelectronic sub-module are provided. A molded element having a major surface and an edge surface is formed. Electrical tracings are disposed on the major surface of the molded element. A light transmitting device having a working portion is joined to the molded element with the working portion of the light transmitting device directed perpendicularly to the edge surface of the molded element, and wherein the light transmitting device is connected to at least one of the electrical tracings. An angled reflective surface is formed that transects the major surface and the edge surface of the molded element. A photodetector having a working portion is positioned on the major surface with the working portion of the photodetector positioned over the angled surface, and with the photodetector connected to at least one of the electrical tracings on the molded element.

DETAILED DESCRIPTION OF THE DRAWINGS

Figure 1:
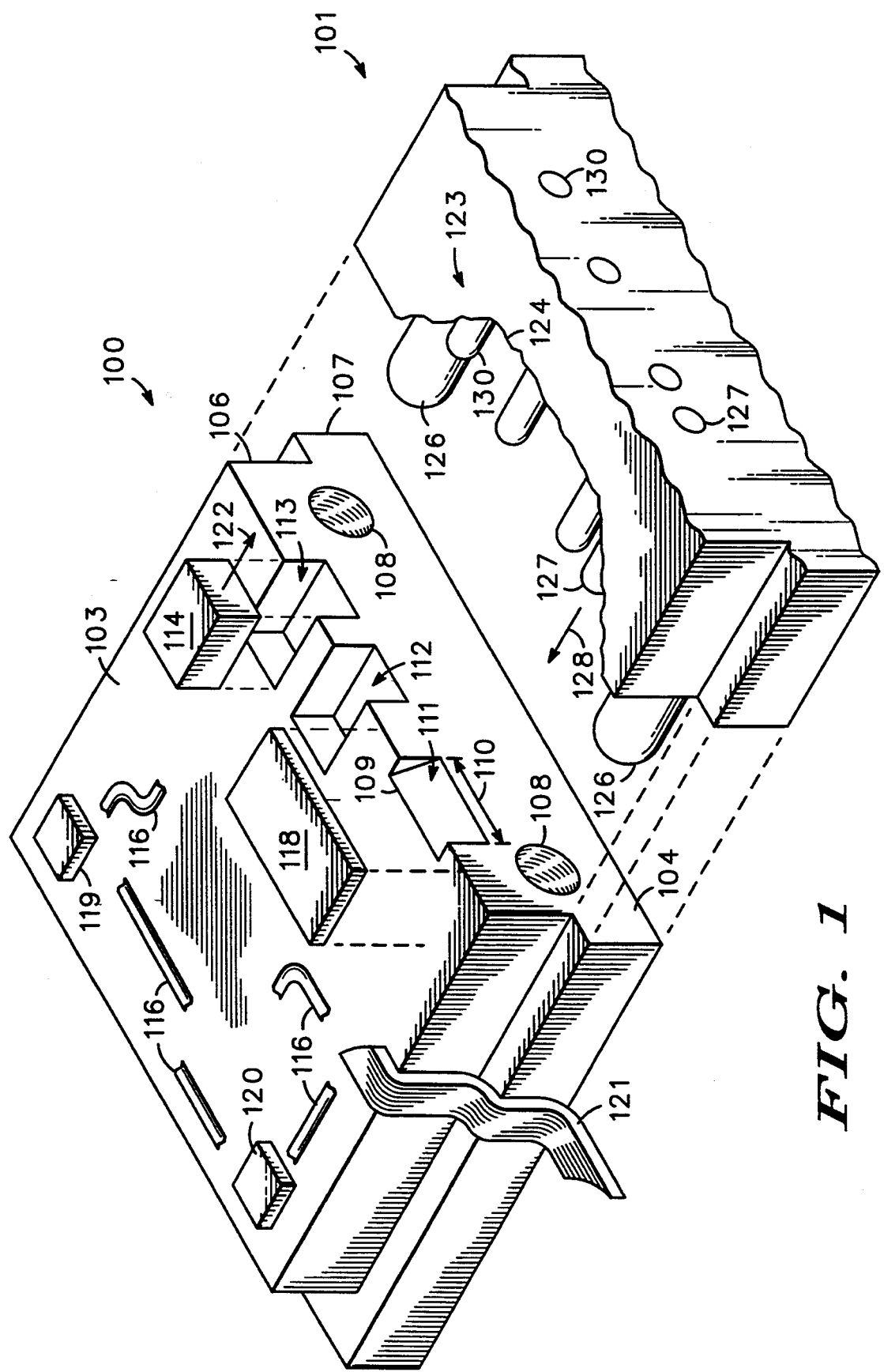
FIG. 1 is an exploded view of an embodiment of an optoelectronic sub-module with an optical connector having portions of both the optoelectronic sub-module and the optical connector thereof removed.

FIG. 1 illustrates an optoelectronic sub-module 100 with an optical connector 101. Sub-module 100 converts an optical signal into an electrical signal or converts an electrical signal into an optical signal. Typically, sub-module 100 is made in accordance to the teachings of copending applications that bear Ser. Nos. 07/889,335 now U.S. Pat. No. 5,265,184 and 08/091,731, pending titled MOLDED WAVEGUIDE AND METHOD OF MAKING SAME and MOLDED WAVEGUIDE WITH A UNITARY CLADDING REGION AND METHOD OF MAKING, filed May 28, 1992 and Feb. 19, 1993, respectively.

Sub-module 100 is a molded element that forms a major surface or a surface 103 and an edge surface 104. Additionally, sub-module 100 is capable of being molded to provide an upper portion 106 and a lower portion 107 that are subsequently attached or joined to form sub-module 100. Generally, sub-module 100 is a molded plastic material; however, in this particular embodiment of the present invention, other materials such as ceramics are capable of being used.

Edge surface 104 generally is a flat or a facet surface having alignment ferrules 108. Alignment ferrules 108 are made by any suitable method, such as molding, precision milling, laser ablating, or the like. However, in a preferred embodiment of the present invention, alignment ferrules 108 are made during the molding process of sub-module 100, thereby securing precise and accurate alignment of alignment ferrules 108 to other features and optical devices located on surface 103. For example, molding alignment ferrules 108, an angled reflector surface 109, and slots or grooves 112 and 113 at one time, fixes a physical relationship that precisely aligns alignment ferrules 108 with angled reflector surface 109 and slots or grooves 112, 113, thereby enabling accurate and reproducible alignment of these features. Moreover, it should be understood that finishing methods such as, cleaning, threading, polishing, and the like are sometimes used to finish or to complete formation of alignment ferrules 108.

Angled reflective surface 109 is made by any suitable method, such as precision machining, laser ablating, or the like. However, in a preferred embodiment of the present invention, angled reflective surface 109 is made during the molding process of submodule 100 so as to provide a reflective surface 111.

Generally, angled reflective surface 109 transects or cuts across surface 103 and edge surface 104, thus describing reflective surface 111. Reflective surface 111 is capable of being set at an angle ranging from 30 degrees to 60 degrees; however, in a preferred embodiment of the present invention, reflective surface 111 is set at an angle of 45 degrees. Additionally, reflective surface 111 is capable of being coated with a reflective material by any suitable well-known method, such as evaporation, sputtering, or the like. Typically the reflective material is a metal material, such as gold, platinum, aluminum, or the like, thereby increasing the reflectivity of reflective surface 111. Further, it should be understood that selection of a length 110 of reflective surface 111 is application specific, thus any length 110 is capable of being selected.

Slots or channels 112 and 113 are made by any suitable method, such as molding, precision milling, laser ablating, or the like. However, in a preferred embodiment of the present invention, slots or channels, 112 and 113 are made during the molding process of submodule 100. Generally, dimensions or physical sizes of slots 112 and 113 are similar to light transmitting devices, illustrated by light transmitting device 114, that are subsequently set into slots 112 and 113.

After basic fabrication of sub-module 100 has been completed as described hereinabove, electrical tracings 116 are disposed on surface 103 by well-known methods in the art. For example, a metal material is deposited onto surface 103 by any well-known method, such as evaporation, sputtering, or the like. The deposited metal material subsequently is patterned and etched by well-known methods in the art, such as photolithography patterning and chemically or physically etching the deposited metal material, thereby making electrical tracings 116.

Generally, electrical tracings 116 provide electrical interconnection or electrical coupling between a variety of components such as light emitting device 114, a photodetector 118, integrated circuits 119 and 120, and lead frame member 121. While individual connections to these components are not shown in FIG. 1, interconnection of these various components are well known in the art and need not be discussed in detail herein. For example, interconnection between electrical tracings 116 are capable of being achieved by any suitable method, such as wire bonding, bumping, TAB, or the like.

Photodetector 118 having a working portion (not shown) is electrically and mechanically mounted on surface 103 of sub-module 100. Generally, photodetector 118 is capable of being either a single photodetector or an array of photodetectors. Photodetector 118 typically is mounted in such a manner that the working portion of photodetector 118 is positioned over reflective surface 111, thereby enabling light signals reflected from reflective surface 111 to be reflected into the working portion of photodetector 118. Additionally, photodetector 118 is electrically and mechanically interconnected to electrical tracings 116 as previously described. Photodetector 118 is capable of being any suitable type of photodetector; however, in a preferred embodiment of the present invention, photodetector 118 is a photodiode, such as a gallium arsenide p-i-n photodiode, a silicon p-i-n photodiode, or the like. The p-i-n photodiode used in the preferred embodiment of the present invention additionally is formed with electrical contacts (not shown) on the same side as the working portion, thereby allowing the p-i-n photodetector to be mounted and electrically interconnected with electrical tracings with bump methods, such as gold bumping, solder bumping, electrically conductive bumping, or the like. Additionally, it should be understood that photodetector 118 is capable of also being a lasing device, such as a Vertical Cavity Surface Emitting Laser (VCSEL).

Light emitting device 114 is a chip having an edge emitting laser built thereon. However, it should be understood that light emitting device 114 is capable of being an array of edge emitting lasers. In a preferred embodiment of the present invention, the edge emitting laser is configured so as to enable light or a light signal, represented by arrow 122, to be directed perpendicularly from the edge emitting laser and from edge surface 104 toward connector 101. Additionally, light emitting device 114 is electrically and mechanically interconnected to electrical tracings 116 as previously described.

Placement or mounting of photodetector 118 and light emitting device 114 typically is achieved by an automated system, such as a robotic arm, or the like. In the case of mounting of photodetector 118, the robotic arm places photodetector 118 in such a manner that the working portion of photodetector 118 is placed over reflective surface 111. Typically, affixing or mounting of photodetector 118 to surface 103 is achieved by any suitable method, such as adhering, soldering, bumping, or the like. Further, if the p-i-n photodiode is designed to receive light through a transparent substrate additional flexibility for electrical interconnection by wire bonding is provided.

Additionally, it should be understood that some methods combine both adhesion and electrical connection into one operation, thus enabling photodector 118 and light emitting device 114 to be mechanically and electrically attached to sub-module 100 in one operation. For example, with appropriate electrical tracings provided on surface 103, and with photodetector 118 fabricated with electrical contacts on a bottom surface of photodetector 118, a conductive epoxy is used to electrically interconnect or couple photodetector 118 to the appropriate electrical tracings 116, thereby adhering and electrically connecting photodetector 118 to electrical tracings 116. Further, it should be understood that by utilizing an appropriate robotic arm to position and mount photodetector 118, precise and accurate alignment of photodetector 118 is achieved. Moreover, other alternative methods for electrically connecting photodetector 118 to electrical tracings may also be used, such as wire bonding and the like.

Additionally, light emitting device 114 is also positioned and aligned by a robotic arm. However, alignment of light emitting device 114 additionally is enhanced by having light emitting device 114 physically fit into channels 112 or 113, as well as being robotically placed. Generally, light emitting device 114 is interconnected or coupled to electrical tracings 116 by any suitable method, such as wire bonding, solder bumps, conductive epoxy bumps, or the like. However, in a preferred embodiment of the present invention, wire bonding between light emitting device 114 and appropriate electrical tracings 116 is used.

As shown in FIG. 1, mechanically transferable connector or optical connector 101 is formed around a plurality of optical fibers 123. A portion 124 of optical connector 101 has been removed so as to make the plurality of optical fibers 123 clearly visible. In addition, alignment guides 126 are fabricated as part of optical connector 101 so as to form a complete optical connector 101.

Engagement of alignment guides 126 with alignment ferrules 108 brings the plurality of optical fibers 123 into a workable or operably coupled position so as to engage photodetector 118 and light emitting device 114. More particularly, operative engagement of optical connector 101 and sub-module 100 allows an optical fiber 127 to be aligned with reflective surface 111. For example, a light signal or an optical signal, illustrated by arrow 128, traveling through optical fiber 127 and towards sub-module 100 is reflected off reflecting surface 111 and into the working portion of photodetector 118. Thus, optical signal 128 is converted or translated into an electrical signal by photodetector 118. Once optical signal 128 is converted into an electrical signal by photodetector 118, the electrical signal subsequently is distributed to electrical tracings 116. Further, the electrical signal is then either manipulated by either integrated circuits 119 and 120 and sent out through lead frame member 121 or the electrical signal is directly sent out through lead frame member 121. Additionally, it should be understood that the manipulation of the electrical signal is enhanced by having integrated circuits 119 and 120 do the manipulation, as well as shortening a period of time required for such manipulation.

Additionally, operative engagement of optical connector 101 and sub-module 100 also allows an optical fiber 128 to be aligned with light emitting device 114. For example, with light emitting device 114 being an edge emitting laser that is appropriately connected to electrical tracings 116, an electrical stimulus or electrical signal from an appropriate electrical tracings 116 excites the edge emitting laser to emit an optical signal or light signal, illustrated by arrow 122. Since alignment guides 126 of optical connector 101 are engaged by alignment ferrules 108 that are precisely placed such as by molding. Light signal 122 from the edge emitting laser is perpendicularly emitted from surface 104 and into optical fiber 128.

Electrical stimulation of light transmitting device 114 is capable of originating from several sources, such as lead frame member 121 or integrated circuits 119 or 120. Upon electrical stimulation of light emitting device 114 from whatever source, light emitting device 114 converts the electrical stimulation into an optical signal or light signal, illustrated by arrow 122, that is directed into optical fiber 128. Additionally, it should be understood that by having integrated circuits 120 and 119 electrical, manipulation and adjustments may be made at sub-module 100 so as to affect incoming and outgoing signals, thus improving efficiency by not having to have electrical signals directed out to an accessory board (not shown) for processing.

Figure 2:
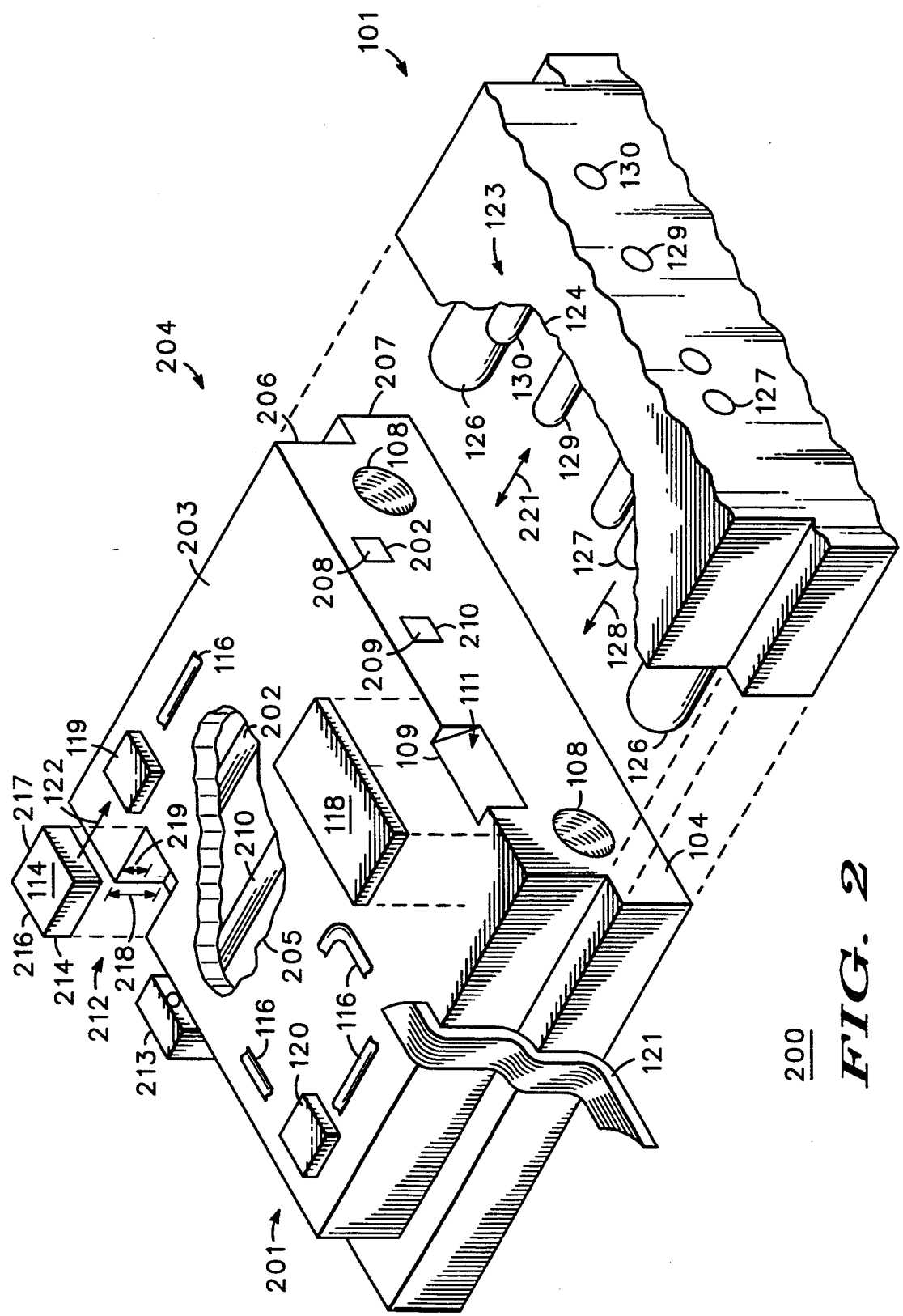
FIG. 2 is an exploded view of another embodiment of an optoelectronic sub-module with an optical connector having portions of both the optical electronic sub-module and the optical connector thereof removed.

FIG. 2 illustrates an exploded pictorial perspective view of an optoelectronic sub-module 200. Molded optical portions having core regions 202 and 210 surrounded by a cladding region 204 with a portion 205 thereof removed, thereby exposing top portions of core regions 202 and 210. In addition, optical connector 101 is illustrated with a portion 124 thereof also removed, thereby exposing the plurality of optical fibers 123.

Generally, optoelectronic sub-module 200 converts an optical signal into an electrical signal or converts an electrical signal into an optical signal. Typically, optoelectronic sub-module 200 is made in accordance with the teachings of copending patent applications bearing Ser. Nos. 07/889,335 U.S. Pat. No. 5,265,184 and 08/019,731 pending, entitled MOLDED WAVEGUIDE AND METHOD OF MAKING SAME and MOLDED WAVEGUIDE WITH A UNITARY CLADDING REGION AND METHOD OF MAKING, filed on May 28, 1992 and Feb. 19, 1993, respectively. Additionally, it should be understood that features described in FIG. 1 and having similar functions will retain their original identifying number in FIG. 2.

Sub-module 200 is made so as to provide a major surface or surface 203, an edge surface 104, and another edge surface 201. Generally, sub-module 200 is capable of being molded with cladding region 204 having either an upper portion 206 and a lower portion 207 or as a single unitary cladding region that combines both upper and lower portions 206 and 207 to surround core regions 202 and 210, thereby forming a waveguide. Materials used to fabricate cladding region 204 and core regions 202 and 210 for sub-module 200 are discussed in detail in both copending applications identified hereinabove.

Edge surfaces 201 and 104 generally are flat or facet surfaces. Surface 104 includes alignment ferrules 108, as well as exposing cross-sectional surfaces 208 and 209 of core regions 202 and 210, respectively.

Alignment ferrules 108 have been previously described in FIG. 1; however, in a preferred embodiment of the present invention as illustrated in FIG. 2, alignment ferrules 108 are made during the molding process of submodule 200, thereby securing precise and accurate alignment of alignment ferrules 108 with reference to features, such as core regions 202 and 210, as well as other optical devices located on surface 103, such as a photodetector 118, a photonic device 213, and light emitting device 114. Further, by making alignment ferrules 108 during the molding process, precise and accurate alignment of optical fibers 123 of optical connector 101 to the features and the optical devices of sub-module 200 is achieved.

Angled reflective surface 109 and photodetector 118 have been previously described in FIG. 1.

Slot or channel 212 is made by any suitable method, such as molding, precision milling, laser ablating, or the like. However, in a preferred embodiment of the present invention, slot or channel 212 is made during the molding process of sub-module 200, thereby ensuring alignment of slot 212 to core region 202. Generally, dimensions or physical sizes of slot 212 are similar to dimensions or physical sizes of light emitting device 114 that is subsequently set into slot 212.

More specifically, in a preferred embodiment of the present invention, light emitting device 114 is an edge emitting laser that emits light, as illustrated by an arrow 122. The edge emitting laser has a height 214, a width 216, and a length 217. Slot 212 is molded to a similar width as width 216 of the edge emitting laser, thereby ensuring accurate lateral placement of the edge emitting laser to slot 212. Further, slot 212 is molded to a desired depth 218. Desired depth 218 is determined by calculating by the desired depth. The desired depth is equal to height 214 of edge emitting laser plus a distance 219.

Distance 219 is equal to a distance from surface 203 to a center of core region 202, thus centering edge emitting laser 114 in core region 202, thereby directing the emitted light into core region 202 that travels through core region 202 toward optical connector 101.

As illustrated in FIG. 2, core regions 202 and 210 extend through submodule 200 from surface 104 to surface 201. Core regions 202 and 210 terminate or end at surfaces 104 and 201 as a flat planar surface or facet, thereby exposing cross-sectional surfaces 208 and 209 of core regions 202 and 210, respectively, on surface 104, as well as exposing the cross-section surfaces of core regions 202 and 210 on surface 201. It should be understood that core regions 202 and 210 are capable of being made with cross-sections having many different shapes, such as grooves, cones, triangles, or the like. Moreover, while FIG. 2 illustrates that core regions 202 and 210 are formed in approximately straight lines, it should be understood that core regions 202 and 210 are capable of being formed in curved lines, as well as having core regions 202 and 210 being split to form divergent waveguides, as well as waveguide combiners. For example, where the waveguide diverges or splits from one to a plurality of waveguides, and where a plurality of waveguides coalesce or combine to form a single waveguide.

As previously described in FIG. 1, after basic fabrication of sub-module 200 has been completed, electrical tracings 116 are disposed on surface 203 by well-known methods in the art, thereby enabling electrical interconnection or coupling of electrical components such as integrated circuits 119 and 120 with optical devices such as photodetector 118, photonic device 213, light emitting device 114, and lead frame member 121.

Photonic device 213 is capable of being either a photo-receiver or a photo-transmitter. When photonic device 213 is a photo-transmitter, the photo-transmitter has a working portion that emits light. In a preferred embodiment of the present invention, the photo-transmitter is vertical cavity surface emitting laser (VCSEL) that is mounted in such a manner that upon excitation of the VCSEL light is generated from the working portion of the VCSEL that is directed into core region 210. When photonic device 213 is a photo-receiver, the photo-receiver has a working portion that collects light from core region 210. In a preferred embodiment of the present invention, the photo-receiver is a photodiode such as a p-i-n photodiode or the like. The photodiode typically is mounted in such a manner that upon light excitation from light traveling through core region 210 the working portion of the photodiode captures the light and converts the light into an electrical signal.

Since photodetector 118 having a working portion has been previously described in FIG. 1, only a brief description is provided hereinbelow. Briefly, photodector 118 is capable of being mounted on surface 203 of submodule 200, thereby enabling an alternative photodector to photonic device 213, when photonic device 213 is a photodetector. Additionally, photodector 118 is capable of being used in conjunction with photonic device 213 when photonic device 213 is either a photo-receiver or a photo-transmitter.

Additionally, since placing or mounting of photodetector 118 and light emitting device 114 have been previously discussed in FIG. 1, only a brief description of placing or mounting is provided for photodetector 118, light emitting device 114, and photonic device 213. Generally, photodetector 118, light emitting device 114, and photonic device 213 are all placed and mounted to sub-module 200 by an automated system (not shown), such as a robotic arm, or the like. Use of robotic arm provides flexibility of motion coupled precision and accuracy of approximately ±2.0 microns.

Generally, interconnection or coupling between photodetector 118, light emitting device 114, and photonic device 213, electrical tracing 116, and lead frame member 121 is accomplished as previously described in FIG. 1 for light emitting device 114 and for photodetector 118.

Optical connector 101 having a plurality of optical fibers has previously been described in FIG. 1.

Engagement of alignment guides 126 with alignment ferrules 108 brings the plurality of optical fibers 123 into a workable or operably coupled position so as to engage photodetector 118, light transmitting device 114, and photonic device 213. More particularly, operative engagement of optical connector 101 and sub-module 200 allows optical fibers 127, 128, and 129 to be aligned with reflective surface 111, core region 202, and core region 210, respectively.

For example, a light signal, illustrated by arrow 128, traveling through optical fiber 127 and towards submodule 200 is reflected off reflecting surface 111 and into the working portion of photodetector 118. Thus, the optical signal is converted or translated into an electrical signal by photodetector 118.

In another example, a light signal, illustrated by arrow 122, is generated by light emitting device 114. Light signal 122 is directed from light emitting device 114 into core region 202 on surface 201. Light signal 122 travels through core region 202 to cross-sectional surface 208. Since optical fiber 128 is operably engage, light signal 122 is directed into optical fiber 128 of optical connector 101. Since cross-sectional surface 208 and cross-sectional surface located on surface 201 of core region 202 in groove 212 are molded, precise alignment of core region 202 to optical fiber 128 is achieved, thereby operably engaging optical fiber 128 and light signal 122. Thus, the optical signal is converted or translated into an electrical signal by photodetector 118.

In yet another example, a light signal, illustrated by a double arrow 221, travels either toward photonic device 213 or from photonic device 213, depending upon whether photonic device 213 is either a photoreceiver or a phototransmitter. Light signal 221 travels through core region 210 which is operably engaged with optical fiber 129 of optical connector 101.

Generally, when photonic device 213 is a photoreceiver and with photodetector 118 in place, light signals 128 and 221 are converted to electrical signals by photodetector 118 and photonic device 213. The electrical signals subsequently are distributed to electrical tracings 116 as described hereinabove. Additionally, the electrical signals also are capable of being either electrically manipulated by integrated circuits 119 and 120 as previously described, or sent out on lead frame member 121.

Electrical stimulation of light transmitting device 114 and photonic device 213 is capable of originating from several sources, such as lead frame member 121 or integrate circuits 119 or 120, thus converting the electrical stimulation from whatever source to an optical signal or light signal, illustrated by arrows 122 and 221, respectively.

Figure 3:
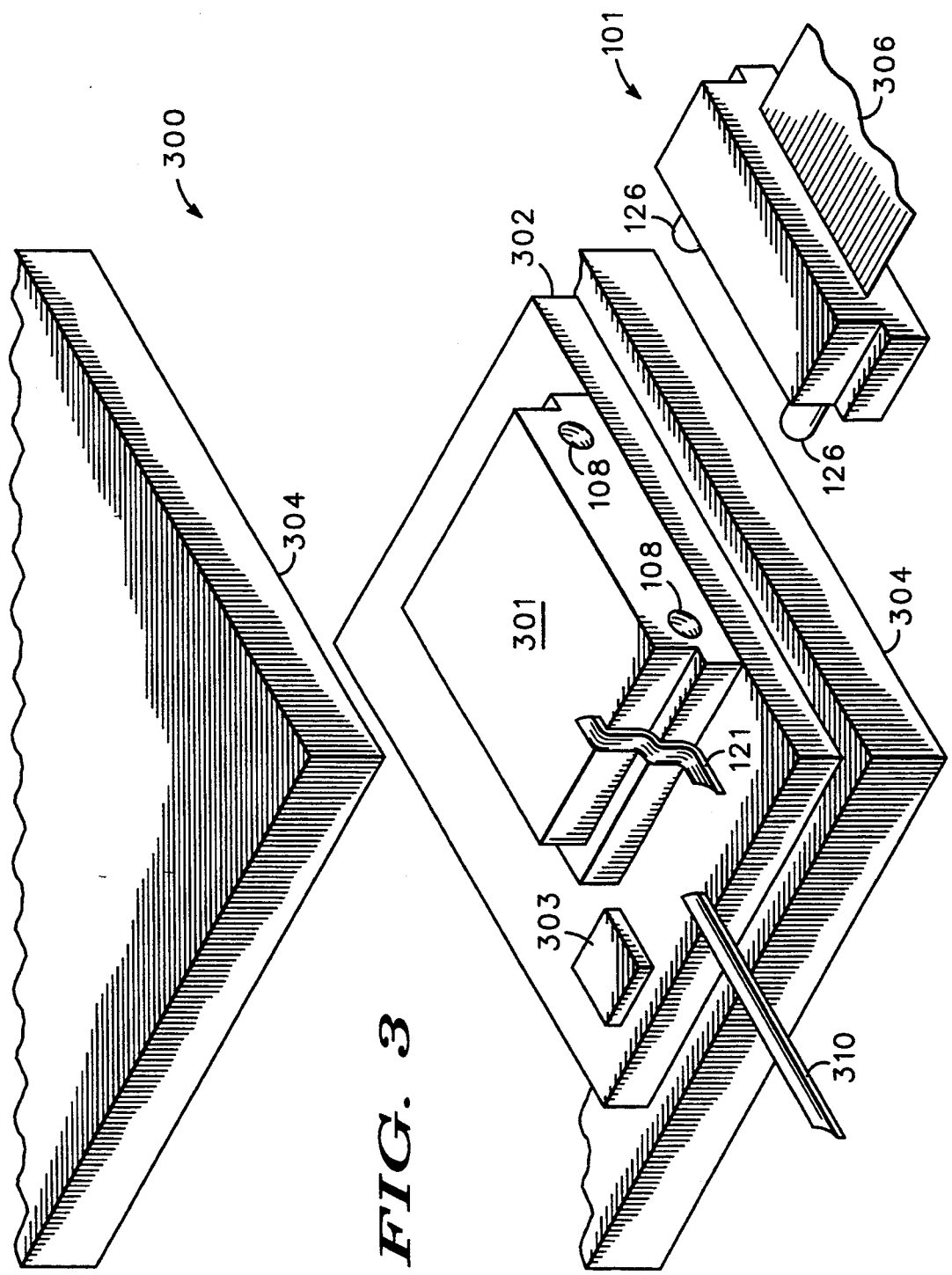
FIG. 3 is a pictorial perspective view of an optoelectronic module.

FIG. 3 is a simplified partially exploded pictorial view of an optical electronic module 300 including submodule 301 and an interconnect board 302. In the present invention, sub-module 301 is capable of being either an embodiment of submodule 100 or 200 as previously described in FIGS. 1 and 2 and attached to an interconnect board 302. Additionally, it should be understood that submodule 300 is capable of being electrically coupled to standard electronic components, such as a capacitor (not shown), a resistor (not shown), an integrated circuit 303, or the like.

As illustrated in FIG. 3, electrical interaction between submodule 301 and interconnect board 302 is achieved by lead frame member 121. However, it should be understood that electrical interaction is capable by several methods, such as wire bonding, bumping, or the like. Interconnect board 302 typically is a board having electrical tracings or conductive pathways (not shown) that electrically interconnect a variety of standard electronic components, thus providing additional processing capability of electrical signal from submodule 301.

Generally, submodule 300 is attached to an interconnect board 302 by any suitable method, such as adhering, press fitting, molding or the like. However, in a preferred embodiment of the present invention, an epoxy adhesive is applied to interconnect board 302 at an approximate location where submodule 301 and interconnect board 302 are to be bonded. Submodule 301 is placed onto the adhesive by an automated system (not shown) such as a robot arm, thereby providing accurate placement and orientation of submodule 301 to interconnect board 302.

Electrical coupling of standard electrical components, as illustrated by integrated circuit 303, on interconnect board 302 to submodule 301 is achieved by any suitable method, such as wire bonding, tab bonding, or the like. In a preferred embodiment of the present invention, lead frame member 121 of submodule 301 is used to bond submodule 301 to interconnect board 302, as well as to electrically interconnect sub-module 301 to interconnect board 302. Further, it should be evident by one skilled in the art, that many more electrical couplings typically are necessary to fully utilize inputs and outputs of the standard electrical components and the optical components of submodule 301, however, for the sake of simplicity only lead frame member 121 is shown.

Further, electrical coupling of optical electronic module 300 is achieved by lead frame member 310. However, it should be understood that lead frame member 310 only illustrates one of a plurality of lead frame members that are capable of being formed and electrically coupled with interconnect board 302. It should be further understood that many configurations of the lead frame members are possible, such as quad flat packages, single in line packages (SIPs), overmolded pad array carriers, (OMPAC), glob tops, or the like.

Further, plastic encapsulation of interconnect board 302 and submodule 301 typically is achieved by an overmolding process, represented by plastic pieces 304, which encapsulates interconnect board 302 and submodule 301 while leaving alignment ferrules 108 open and clear of debris. Alignment ferrules 108 are then engaged by alignment guides 126 of connector 101 having attached thereto fiber optic ribbon 306, thereby providing accurate and repeatable alignment of optical connector 101 to submodule 301.

By now it should be appreciated that a novel optoelectronic sub-module is disclosed using an edge emitting laser, a photonic device, and a photodetector. The optoelectronic sub-module is capable of having integrated circuits mounted thereon, thereby providing signal manipulation capablity. Also, the optoelectronic sub-module is capable of being mounted on an interconnect board, thus providing additional circuitry for signal manipualtion.

I claim:

1. An optoelectronic sub-module comprising:
   a unitary molded plastic element having a major surface and an edge surface;
   electrical tracings disposed on the unitary molded plastic element;
   a light transmitting device having a working portion, the light transmitting device joined to the molded plastic element, the working portion of the light transmitting device directed perpendicularly to the edge surface of the unitary molded plastic element, and the light transmitting device connected to at least one of the electrical tracings;
   an angled reflective surface transecting the major surface and the edge surface of the unitary molded plastic element; and
   a photodetector having a working portion, the photodetector positioned on the major surface with the working portion of the photodetector positioned over the angled surface, and with the photodetector connected to at least one of the electrical tracings.

2. An optoelectronic sub-module as claimed in claim 1 wherein the light transmitting device is an edge emitting laser.

3. An optoelectronic sub-module as claimed in claim 1 wherein the photodetector having a working portion is a p-i-n photodiode.

4. An optoelectronic sub-module as claimed in claim 1 wherein the angled reflective surface transecting the major surface and the edge surface is coated with a reflective material.

5. An optoelectronic sub-module as claimed in claim 1 further comprising an alignment ferrule located in the edge surface of the molded element.

6. An optoelectronic sub-module as claimed in claim 5 further comprising:
   an optical connector having a body that surrounds a plurality of optical fibers with an alignment guide for inserting into the alignment ferrule of the optoelectronic sub-module to position at least one of the plurality of optical fibers in optical alignment with the working portion of the light transmitting device.

7. An optoelectronic sub-module as claimed in claim 1 further comprising an integrated circuit mounted on the major surface of the molded element.

8. An optoelectronic sub-module comprising:
   a unitary molded plastic element having a major surface and an edge surface;
   electrical tracings disposed onto the unitary molded plastic element;
   a light transmitting device having a working portion, the light transmitting device joined to the unitary molded plastic element, the working portion of the light transmitting device directed perpendicularly to the edge surface of the molded plastic element, and the light transmitting device connected to at least one of the electrical tracings;
   an angled reflective surface transecting the major surface and the edge surface of the unitary molded plastic element, the angled surface being positioned to receive light directed in a plane parallel with the edge and to reflect the received light generally perpendicular to the major surface; and a photodetector having a working portion, the photodetector positioned on the major surface with the working portion of the photodetector positioned over the angled surface to receive reflected light from the angled reflective surface, and with the photodetector connected to at least one of the electrical tracings.

9. An optoelectronic sub-module as claimed in claim 8 wherein the light transmitting device is an edge emitting laser.

10. An optoelectronic sub-module as claimed in claim 8 wherein the photodetector having a working portion is a p-i-n photodiode.

11. An optoelectronic sub-module as claimed in claim 8 wherein the angled reflective surface is coated with a reflective material.

12. An optoelectronic sub-module as claimed in claim 8 further comprising an alignment ferrule located on the edge surface of the molded element.

13. An optoelectronic sub-module as claimed in claim 12 further comprising a connector having a body that surrounds a plurality of optical fibers with an alignment guide for inserting into the alignment ferule of the optoelectronic sub-module to position at least one of the plurality of the optical fibers to the working portion the photodetector.

14. An optoelectronic sub-module as claimed in claim 8 further comprising an integrated circuit mounted on the major surface of the molded element.

15. A molded optoelectronic waveguide module comprising:

a unitary molded plastic optical portion having a major surface, a first edge surface, a second edge surface with a facet, and having a first waveguide and a second waveguide embedded into the unitary molded plastic optical portion, wherein the first waveguide extends from the first edge surface to the facet, and wherein the second waveguide extends from the first edge surface to the second edge surface;

electrical tracings disposed on the major surface of the unitary molded plastic optical portion;

an edge emitting laser having a working portion, the working portion of the edge emitting laser directed into the facet on the second edge surface, the edge emitting laser connected to at least one of the electrical tracings; and a photodetector having a working portion, the working portion of the photodetector directed into an end of the second waveguide, the photodetector connected to at least one of the electrical tracings.

16. A molded optoelectronic waveguide module as claimed in claim 15 wherein the photodetector having a working portion is a p-i-n photodetector.

17. A molded optoelectronic waveguide module as claimed in claim 15 further comprising an integrated circuit mounted on the major surface of the molded optical portion.

18. A molded optoelectronic waveguide module as claimed in claim 15 further comprising an alignment ferrule locate on the first edge surface of the molded optical portion.

19. A molded optoelectronic waveguide module as claimed in claim 15 wherein the second edge surface with a facet is formed with the facet in an opening in the molded optical portion.

20. A molded optoelectronic waveguide module as claimed in claim 15 further comprising:

a photonic device operably engaged with the second waveguide on the second edge surface.

* * * * *